US012723644B2

(12) United States Patent
Peet

(10) Patent No.: US 12,723,644 B2
(45) Date of Patent: Sep. 1, 2026

(54) GEARBOX WITH CONFIGURABLE IDLER GEAR

(71) Applicant: PT Tech, LLC., Wadsworth, OH (US)

(72) Inventor: Brian J. Peet, Akron, OH (US)

(73) Assignee: PT Tech, LLC., Wadsworth, OH (US)

( * ) Notice: Subject to any disclaimer, the term of this patent is extended or adjusted under 35 U.S.C. 154(b) by 0 days.

(21) Appl. No.: 19/255,283

(22) Filed: Jun. 30, 2025

(65) Prior Publication Data

US 2026/0043465 A1 Feb. 12, 2026

Related U.S. Application Data

(60) Provisional application No. 63/682,190, filed on Aug. 12, 2024.

(51) Int. Cl.

| | |
|---|---|
| ***F16H 57/022*** | (2012.01) |
| ***F16H 1/22*** | (2006.01) |
| ***F16H 57/023*** | (2012.01) |
| ***F16H 57/033*** | (2012.01) |
| *B60K 17/28* | (2006.01) |
| *F16H 57/02* | (2012.01) |

(52) U.S. Cl.

CPC ............. *F16H 57/022* (2013.01); *F16H 1/22* (2013.01); *F16H 57/023* (2013.01); *F16H 57/033* (2013.01); *B60K 17/28* (2013.01); *F16H 2057/02082* (2013.01); *F16H 2057/0224* (2013.01); *F16H 2057/0235* (2013.01); *F16H 2057/0335* (2013.01)

(58) Field of Classification Search

CPC .... F16H 57/022; F16H 57/023; F16H 57/033; F16H 2057/0224; F16H 2057/0335

See application file for complete search history.

(56) References Cited

U.S. PATENT DOCUMENTS

| | | | | |
|---|---|---|---|---|
| 1,887,832 A * | 11/1932 | Brown | F16H 1/006 74/397 |
| 3,150,533 A | 9/1964 | Wallgren | |
| 3,289,310 A * | 12/1966 | Stone | G01B 5/063 74/59 |

(Continued)

OTHER PUBLICATIONS

International Search Report and Written Opinion for Application No. PCT/US2025/035919 dated Sep. 8, 2025 (15 pages).

(Continued)

*Primary Examiner* — William C Joyce

(74) *Attorney, Agent, or Firm* — Michael Best & Friedrich LLP

(57) ABSTRACT

A gearbox includes a housing, input shaft, and a geartrain. An input gear fixed to the input shaft is rotatable about an input axis. An idler gear is rotatable about an idler gear axis and supported by a mount. Output gear(s) are rotated from the idler gear. The mount includes a mount pin extending along a mount axis through the idler gear and an opening in the housing, and an eccentric bushing positioned around the mount pin and centrally within the idler gear. The eccentric bushing is rotatable about the mount axis to alter an offset between the input axis and the idler gear axis. A fastener can lock a position of the bushing in relation to the housing. The fastener is engageable in a first/second hole of the housing to accommodate a first/second gear ratio between the input gear and the output gear(s).

17 Claims, 9 Drawing Sheets

(56) References Cited

U.S. PATENT DOCUMENTS

| | | | | |
|---|---|---|---|---|
| 3,731,552 | A * | 5/1973 | Goodacre ............... | F16H 1/227 74/393 |
| 3,783,710 | A | 1/1974 | Steinhagen | |
| 4,488,447 | A * | 12/1984 | Gebhardt ................ | F02B 67/04 74/393 |
| 5,095,767 | A | 3/1992 | Spridco et al. | |
| 5,540,112 | A * | 7/1996 | Baker ..................... | F16H 57/12 74/397 |
| 6,035,736 | A * | 3/2000 | Gyllner ................. | F16H 57/021 74/397 |
| 6,513,401 | B2 * | 2/2003 | Bologna ............... | F16H 57/023 74/397 |
| 2001/0010177 | A1 | 8/2001 | Bologna | |

OTHER PUBLICATIONS

Twin Disc, Inc., “The Hydraulic PTO Power to Handle Your Toughest Jobs,” brochure © 2023 (12 pages).

* cited by examiner

Y
A4
112
204
214
108
A1
200
206
A3
112
A2

X
A4
112
104
114
108
A1
100
106
A3
112
A2

124
336
326
350
A2
352
348
A5

124
336
526
550
A2
552
548
A5

GEARBOX WITH CONFIGURABLE IDLER GEAR

CROSS-REFERENCE TO RELATED APPLICATIONS

This application claims the benefit of priority to U.S. Provisional Patent Application No. 63/682,190, filed Aug. 12, 2024, the entire contents of which are incorporated by reference herein.

BACKGROUND

A gearbox for a power take-off may be constructed with multiple outputs. An input shaft assembly, which includes shaft, bearings, drive gear and any additional direct-drive interface as a primary output, is driven from a prime mover, such as a heavy duty diesel engine or electric motor. The input assembly may be coupled to the engine directly and may or may not be connected directly to a load, with or without a clutch or other selectively coupled device. Secondary outputs are driven from the drive gear and may or may not spin at the same speed as the input. The input assembly of the power take-off gearbox is driven at a relatively constant speed and is supported by a gearbox housing for rotation about an input axis. Output gears are driven indirectly from the input gear, through a central idler gear. The output gears are configured to drive respective pumps, which attach to the gearbox housing at respective pump pads. The gearbox housing includes defined locations for the axes of the idler gear and the output gears, and the defined locations are determined by existing space claim and customer requirements. The manufacture of the gearbox housing is then specifically dependent upon external requirements, and location of inputs and outputs must not change if the gear ratio changes. When the gear ratio is to be changed for a new application, e.g., due to a different running speed of the engine and/or the pumps, not only do new gears need to be used, but the placement of the idler gear must change, so the gearbox housing also needs to be manufactured for the specific placement of the idler gear.

Devices as described above find utility in a wide range of applications, including but not limited to, recycling grinders, rock crushers, dredgers, marine propulsion, mining equipment, and agriculture machines.

As shown in FIGS. 1-6, the known art provides two gearboxes that are fundamentally similar, but in which the housings must be distinctively manufactured to alter the offset dimension between the input axis of the input gear and the idler axis of the idler gear to account for the different gear ratios of the two gearboxes.

SUMMARY

The present disclosure relates to a gearbox including a housing defining an interior cavity, the housing including a first hole and a second hole. An input shaft is rotatably supported by the housing. A geartrain is situated in the interior cavity, the geartrain including an input gear fixed for rotation with the input shaft relative to the housing about an input axis, an idler gear configured for rotation about an idler gear axis from the input gear and supported by the housing through a reconfigurable mount, and a pair of output gears configured for rotation from the idler gear and supported by the housing. The reconfigurable mount includes a mount pin extending along a mount axis through the idler gear and an opening in the housing, and an eccentric bushing positioned around the mount pin and centrally within the idler gear. The eccentric bushing is rotatable about the mount axis to alter an offset between the input axis and the idler gear axis. A fastener of the mount is configured to lock a rotational position of the eccentric bushing in relation to the opening in the housing. The fastener is engageable in the first hole of the housing to accommodate a first gear ratio between the input gear and the pair of output gears, and the fastener is engageable in the second hole of the housing to accommodate a second gear ratio between the input gear and the pair of output gears.

The present disclosure relates further to a gearbox including an input shaft configured to provide engine power into the gearbox, the input shaft supporting an input gear thereon. A housing of the gearbox supports the input shaft and includes first and second holes. The input shaft and the input gear are rotatable about a first axis that is fixed relative to the gearbox. A second gear is supported by the housing and rotatable relative to the housing about a second axis, wherein the second gear is supported by the housing through a reconfigurable mount. The mount includes a mount pin extending along a mount axis through the second gear and an opening in the housing. A bushing of the mount is positioned around the mount pin and centrally within the second gear. The bushing has a mounting hole for the mount pin that is eccentric with an outer cylindrical surface of the bushing such that the bushing is rotatable about the mount axis to alter an offset between the first axis and the second axis. A fastener of the mount is configured to lock a rotational position of the bushing in relation to the opening in the housing. The fastener is engageable in the first hole of the housing to accommodate a first offset distance between the first axis and the second axis, and the fastener is engageable in the second hole of the housing to accommodate a second offset distance between the first axis and the second axis.

The present disclosure further relates to a method of assembling a gearbox. A housing is provided to accommodate an input gear, an idler gear driven from the input gear, and a pair of output gears driven from the idler gear, the housing having a first opening defining an axis of rotation of the input gear and a second opening defining an axis for a mount pin of the idler gear. The idler gear is mounted on the mount pin with a bushing therebetween, the bushing having an outer cylindrical surface and a mounting aperture through which the mount pin is received, wherein the mounting aperture in the bushing is eccentric with the outer cylindrical surface. The idler gear is mounted to the housing by insertion of the mount pin through the second opening. A selected rotational orientation of the bushing with respect to the housing is set, the selected rotational orientation being based on a gear ratio between the input gear and the pair of output gears, wherein the selected rotational orientation places an anti-rotation feature of the bushing in alignment with one of two separate alignment holes provided in the housing.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include hydraulic or electrical connections or couplings, whether direct or indirect.

Figures 1, 2:
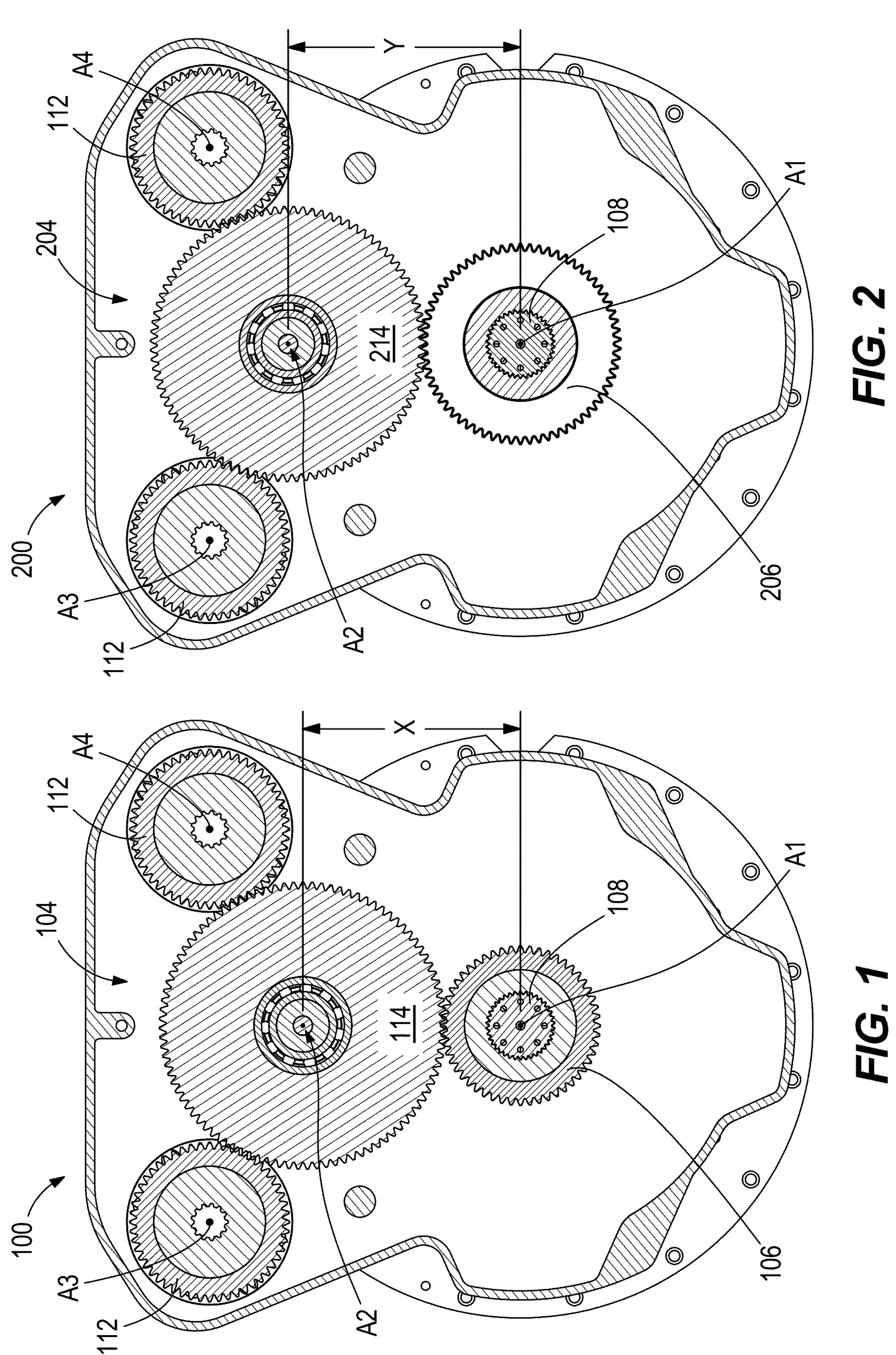
FIG. 1 is a front view of a first conventional gearbox, including a geartrain and a gearbox housing, wherein the gearbox provides a first offset distance between an input gear axis and an idler gear axis, corresponding to a first gear ratio.
FIG. 2 is a front view of a second conventional gearbox, including a geartrain and a gearbox housing, wherein the gearbox provides a second offset distance between an input gear axis and an idler gear axis, corresponding to a second gear ratio.
Figures 3, 4:
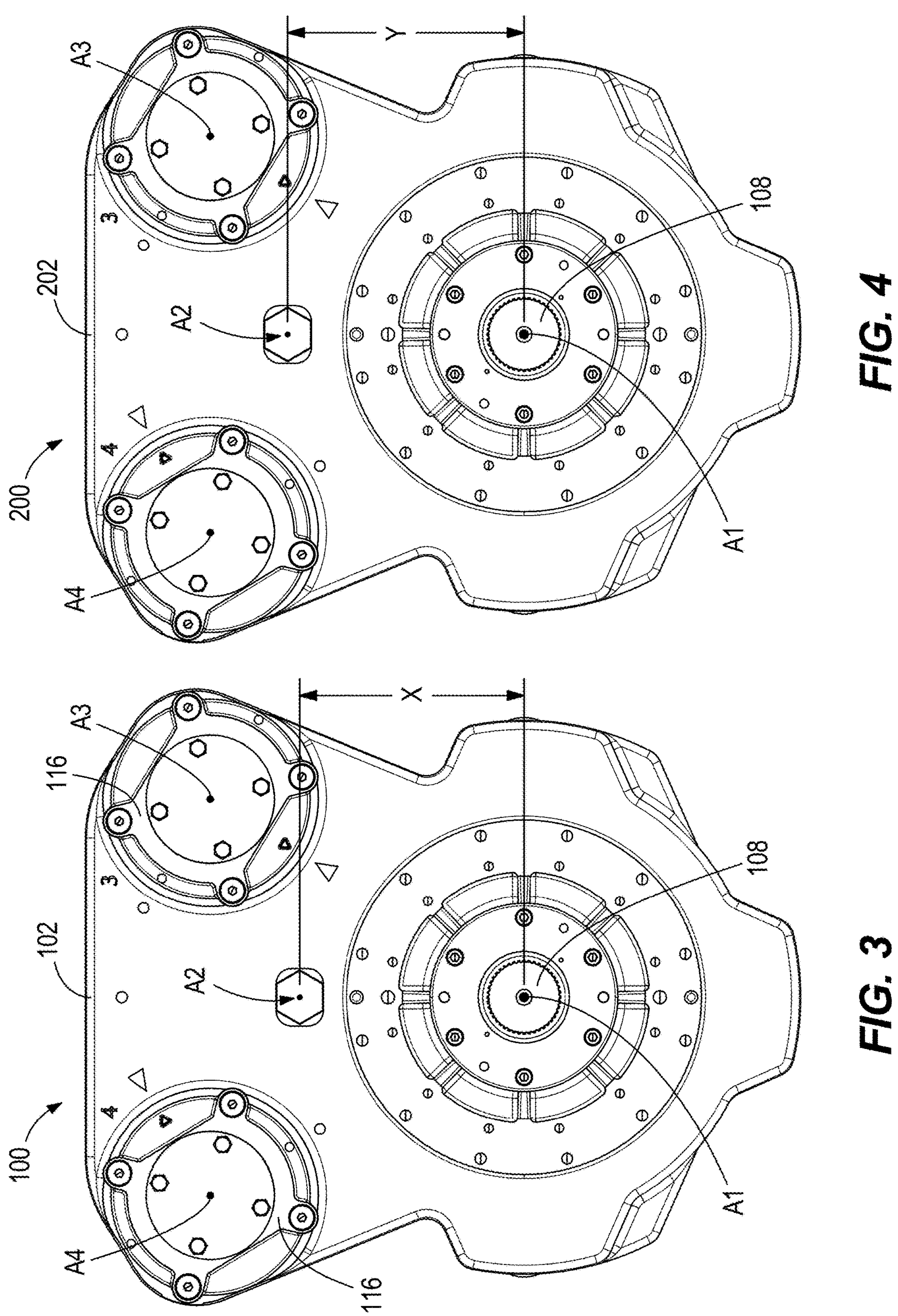
FIG. 3 is a rear view of the first gearbox, illustrating the placement of the opening for securing the idler gear.
FIG. 4 is a rear view of the second gearbox housing, illustrating the placement of the opening for securing the idler gear.
Figure 5:
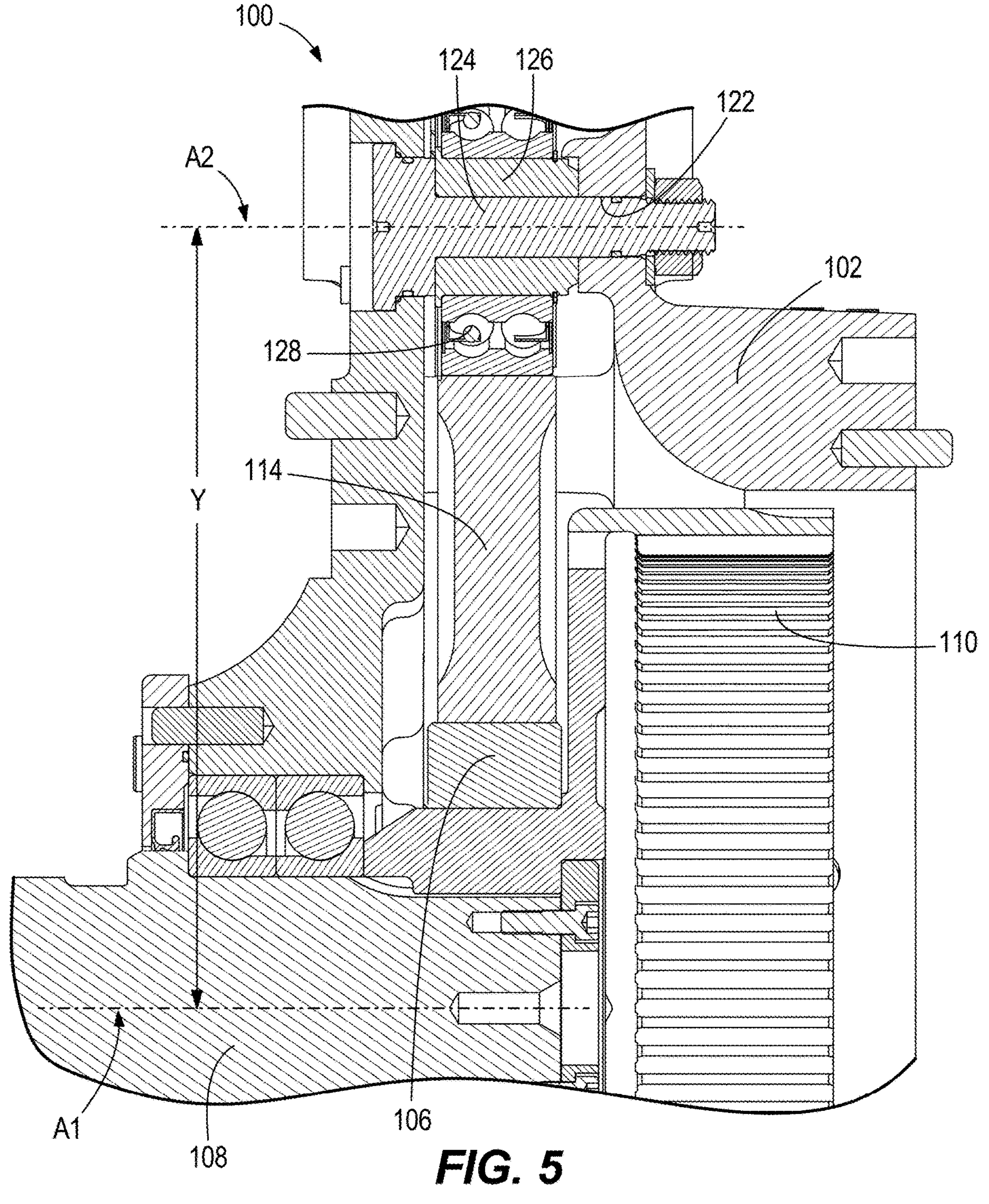
FIG. 5 is a partial cross-section of the first gearbox.

FIGS. 1, 3, and 5 illustrate a first gearbox 100 of conventional construction including a gearbox housing 102 and a geartrain 104 supported by the gearbox housing 102. The geartrain 104 is located within an interior cavity of the housing 102, and the housing 102 also supports the various gears for rotation in defined locations. The gearbox housing 102 can be formed as a single piece or as multiple pieces joined together. The gearbox 102 is a power take-off (PTO). In particular, the geartrain 104 of the gearbox 102 includes an input gear 106 driven from a prime mover (not shown), such as a heavy duty diesel engine, for example. A shaft 108 from the engine extends into the gearbox housing 102, and the shaft 108 is mated to the input gear 106 to form an input shaft assembly. In other words, the input gear 106 is fixed for rotation (i.e., rotates synchronously) with the shaft 108 as the prime mover operates. Power from the engine can also be passed through the power take-off in-line with the engine output via a direct-drive interface for a primary output, e.g., to a clutch, compressor, generator, etc. For example, the shaft 108 has an end coupling 110 for connection to a downstream device, such as those mentioned above or others. The input gear 106 of the PTO gearbox 100 is supported by the gearbox housing 102 for rotation about an input axis A1. Output gears 112 are driven indirectly from the input gear 106, through a central idler gear 114. The output gears 112 are configured to drive respective pumps (not shown) that attach to the gearbox housing 102 at respective pump pads 116. The gearbox housing 102 includes defined locations for the axes of the idler gear A2 and the output gears A3, A4, and the defined locations are determined by the tooth counts (i.e., the diameters) of the various gears in the geartrain. In the gearbox 100 of FIGS. 1, 3, and 5, the gear ratio between the input gear 106 and the output gears 112 is 1:1. An offset distance X is defined between the input axis A1 and the idler gear axis A2. The idler gear 114 is mounted concentrically to an opening 122 of the housing 102 by a mount pin 124, a bushing 126, and a bearing 128 (e.g., rolling element bearing). The distance X between the axes A1, A2 is therefore the distance between the center of the housing opening 122 and the center of an additional opening in the housing 102 for mounting the shaft 108. In some constructions, the opening 122 for the mount pin 124 extends through two adjoining members of the housing 102. The mount pin 124 may be sealed to the housing 102, e.g., at each side of the opening 122. Outside the housing 102, the mount pin 124 may be retained by a nut engaged with a threaded portion of the mount pin 124.

Figure 6:
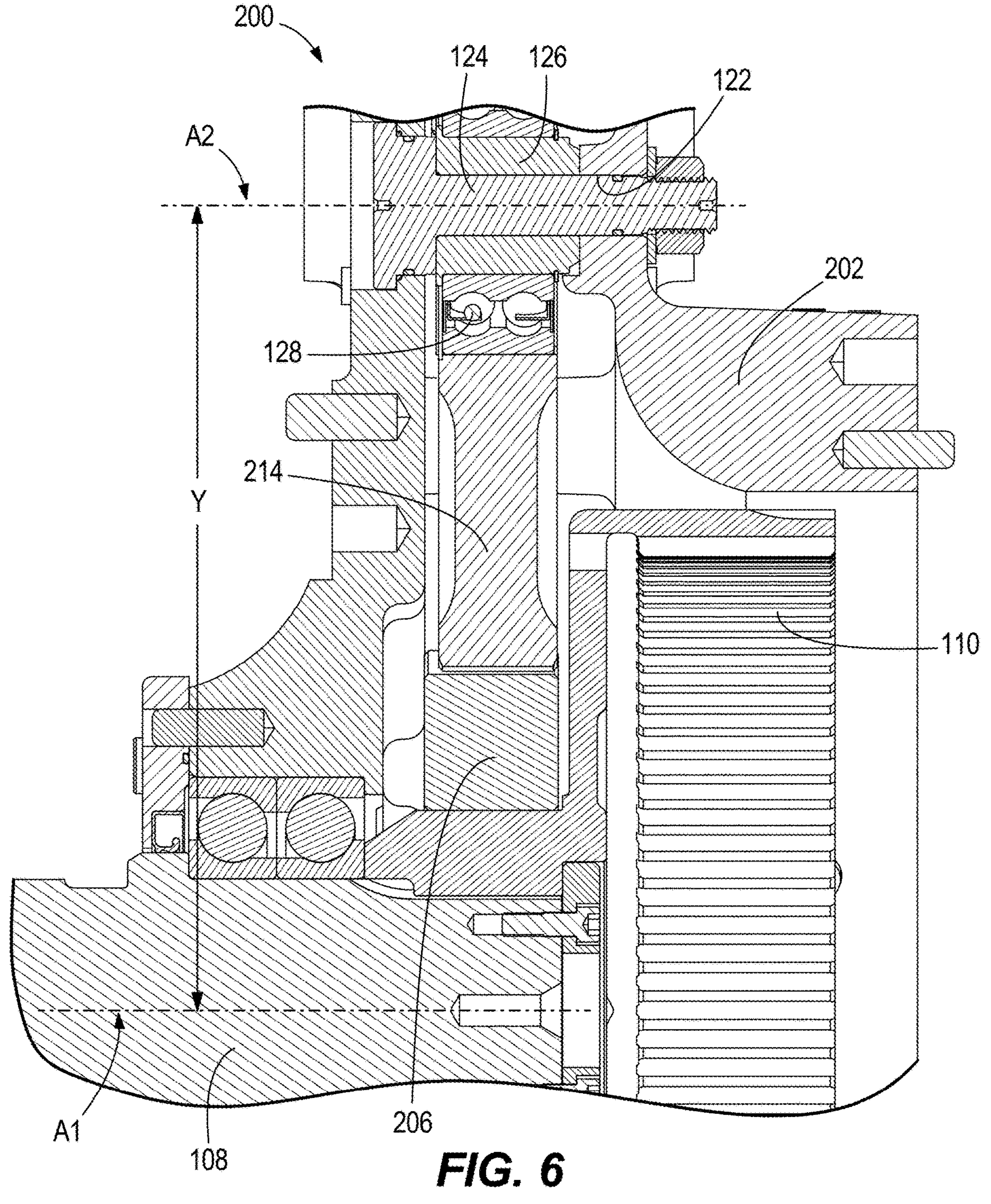
FIG. 6 is a partial cross-section of the second gearbox.

The PTO gearbox 200 of FIGS. 2, 4, and 6 is another of conventional construction, identical to the gearbox 100 except that it is designed to provide a different gear ratio (e.g., 1:1.27), which is accomplished by utilization of an alternate input gear 206 and idler gear 214. The pair of output gears 112 is the same as that of the gearbox 100. However, in changing the input and idler gears 206, 214, the offset distance between the input axis A1 and the idler gear axis A2 changes (from X) to a new offset distance Y. This precludes the housing 202 of the gearbox 200 from being the same as that of the gearbox 100 having the first gear ratio. In other words, the manufacture of the gearbox housings 102, 202 are specifically dependent upon the respective geartrains 104, 204, and the gear ratios thereof. This can be seen clearly in comparing the housings 102, 202 of FIGS. 5 and 6 where the mounting hole 122 is in a different position in relation to the axis A1 of the input gear 106 and shaft 108. In some examples, the gear ratio is changed in response to customer specifications, e.g., to run the pumps at a predetermined speed when re-configured with a different engine having a different fixed running speed. In other words, the speed of the shaft 108 is either a first value (first gearbox 100) or a second value (second gearbox 200), and the resulting pump speed (output gears 112) is desired to be the same. In other examples, a different gear ratio may be selected to change the running speed of the pumps (output gears 112) for a given engine running speed. Although changes to the geartrain are inherently required when changing gear ratios, it would be beneficial to leverage a single gearbox housing for both the gearboxes 100, 200. This is particularly advantageous in large industrial applications where the outer dimensions of the gearbox housing may be on the order of 2-3 feet, and the components are particularly difficult to package, move to/from machining stations, and inventory.

Figure 7:
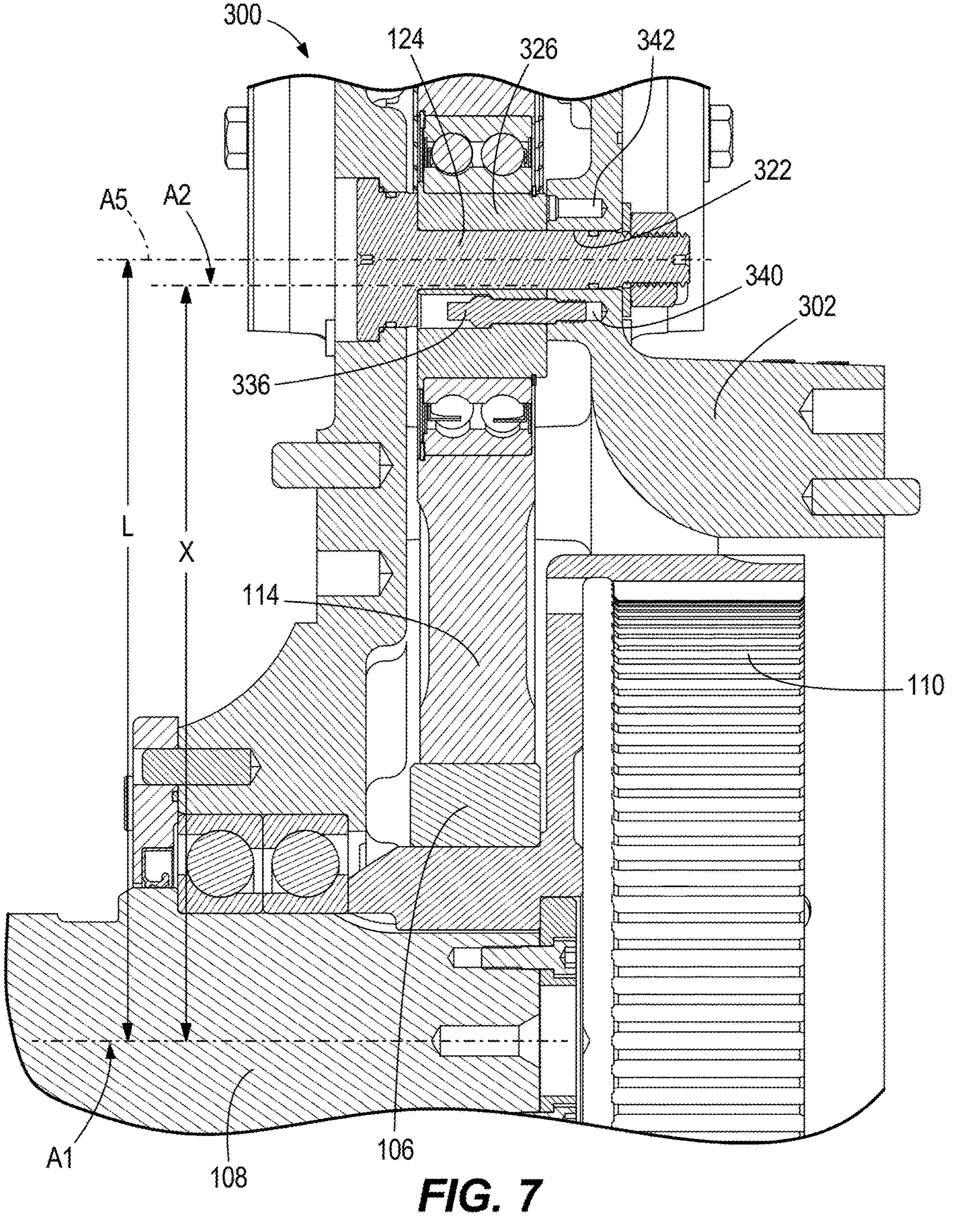
FIG. 7 is a partial cross-section of a gearbox according to one embodiment of the present disclosure, the gearbox including a geartrain and a gearbox housing, wherein the gearbox provides, via an eccentric bushing, the first offset distance between the input gear axis and the idler gear axis, corresponding to the first gear ratio.
Figure 8:
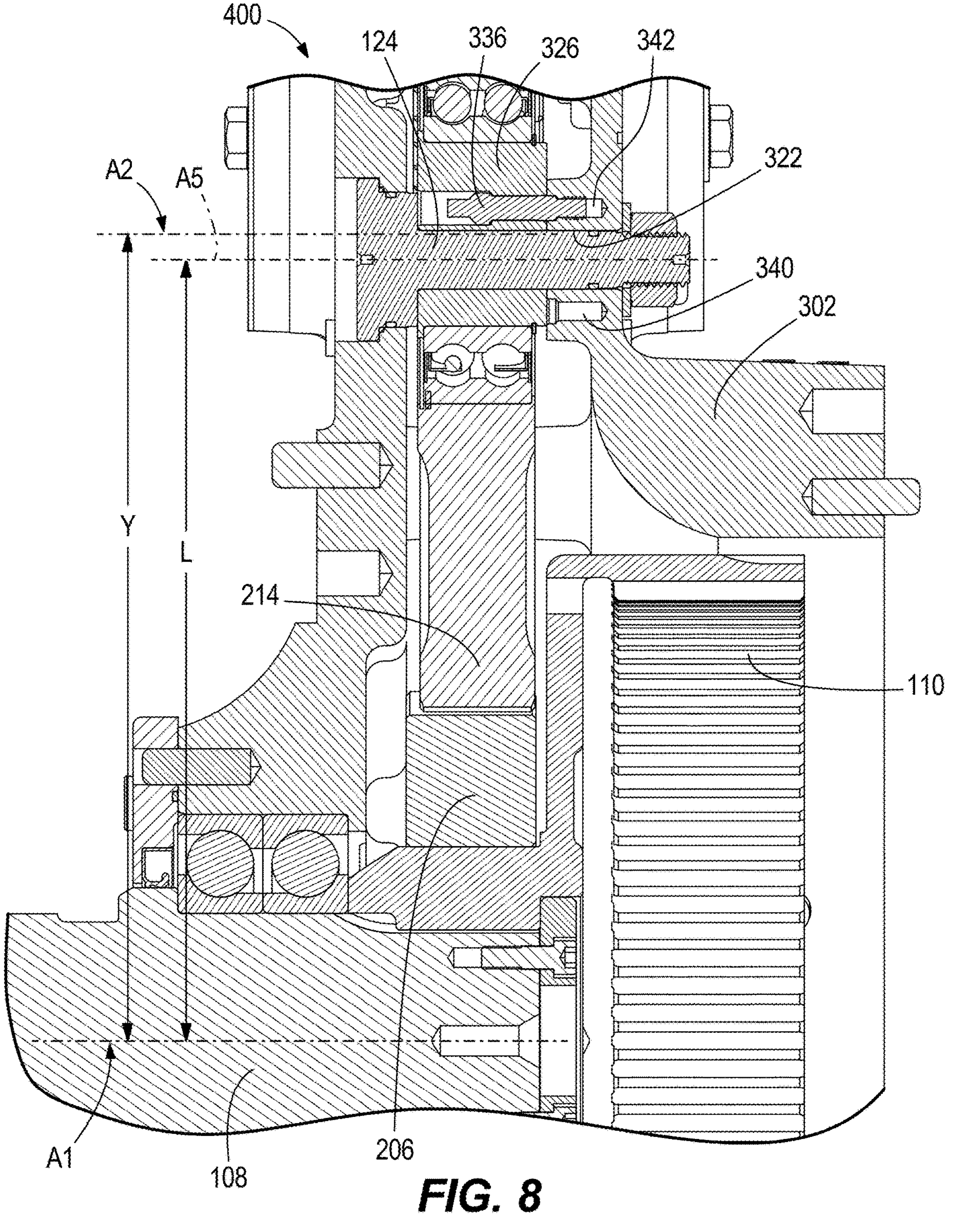
FIG. 8 is a partial cross-section of a gearbox according to another embodiment of the present disclosure, the gearbox including a geartrain and a gearbox housing, wherein the gearbox provides, via the eccentric bushing, the second offset distance between the input gear axis and the idler gear axis, corresponding to the second gear ratio.
Figures 9, 10:
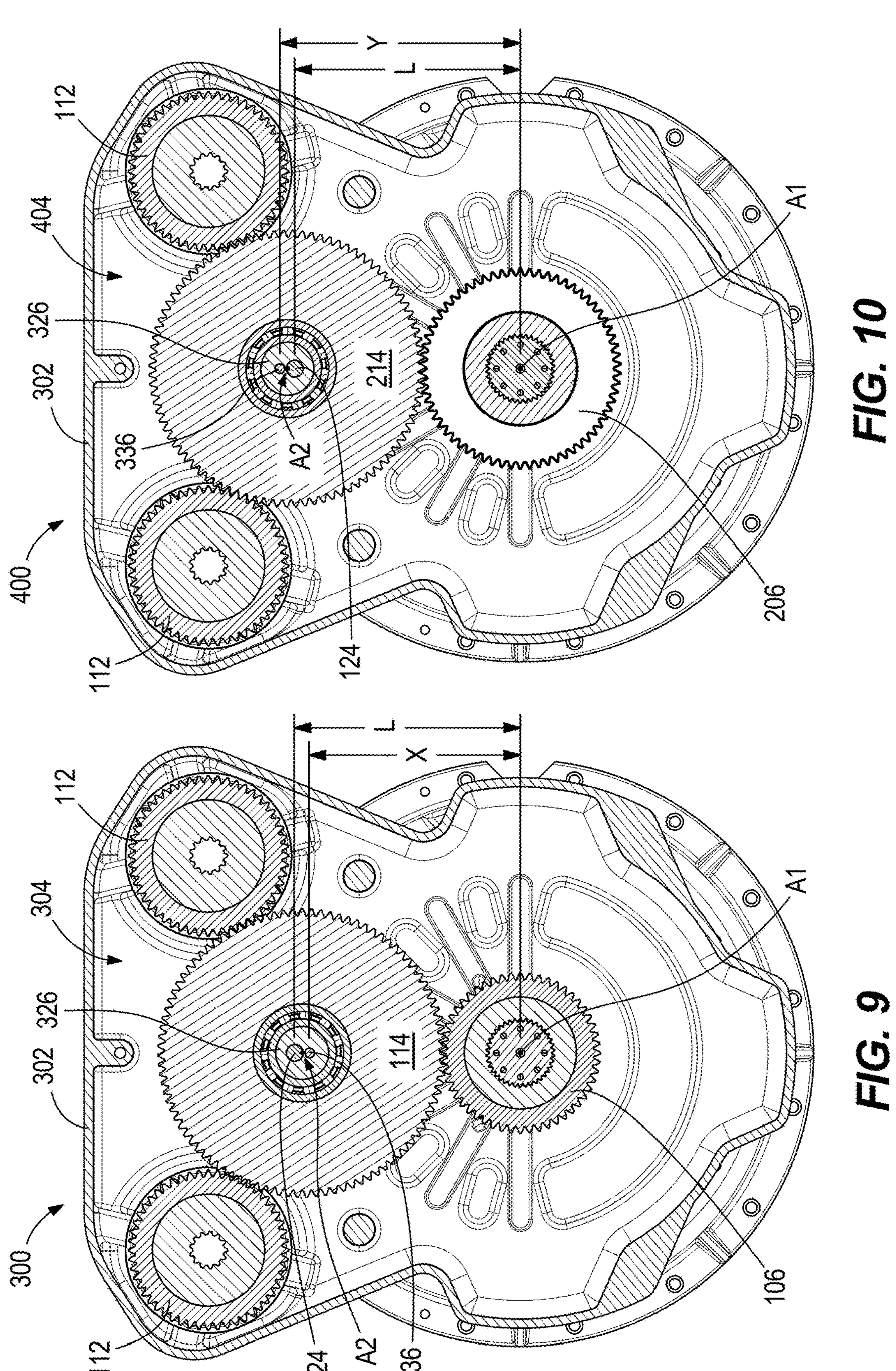
FIG. 9 is a front view of the gearbox of FIG. 7.
FIG. 10 is a front view of the gearbox of FIG. 8.

FIGS. 7 and 9 illustrate a gearbox 300 generally similar to the gearbox 100 of FIGS. 1, 3, and 5—having the same gear ratio and the same offset distance X between the input gear axis A1 and the idler gear axis A2. FIGS. 8 and 10 illustrate a gearbox 400 generally similar to the gearbox 200 of FIGS. 2, 4, and 6—having the same gear ratio and the same offset distance Y between the input gear axis A1 and the idler gear axis A2. As such, the reference numbers in FIGS. 7 to 10 are consistent with those of the preceding figures, with the exception of differentiating features, which are described in further detail below. Although the present disclosure aims to use the same gear ratios and offset distances X, Y as the conventional gearboxes 100, 200, aspects of the invention may also be applied to alternate gear ratios and offset distances and may apply to different geartrain configurations altogether.

Each of the gearboxes 300, 400 supports the respective idler gear 114, 214 via a reconfigurable mount whereby the idler gear axis A2 is non-concentric with the opening 322 of the housing 302 (i.e., non-concentric with a central axis A5 of the opening 322). Each idler gear 114, 214 is mounted in the housing opening 322 by an axle or main pin (referred to herein as the "mount pin") 124, an eccentric bushing 326, and a bearing 128 (e.g., rolling element bearing). The eccentric bushing 326 has an opening along the axis A5 (or "mount pin axis") for the mount pin 124 that is not concentric with the outer cylindrical surface of the bushing 326. Thus, the distance X between the axes A1, A2 is not equal to the distance L between the central axis A5 of the housing opening 322 (and coaxial mount pin 124) and the center of the additional opening in the housing 302 for mounting the shaft 108. When comparing the gearboxes 300, 400 shown in FIGS. 7 and 8, both use an identical housing 302 having the housing opening 322, the machined axis A5 of which is not aligned with the idler gear axis A2 for either the offset X (first gear ratio, e.g., 1:1), or the offset Y (second gear ratio, e.g., 1:1.27). Both gearboxes 300, 400 use the same eccentric bushing 326, in two different orientations. As illustrated, the two different orientations of the eccentric bushing 326 are reversed, in other words rotated 180-degrees or "diametrically opposed."

In addition to the aperture for the mount pin 124, the eccentric bushing 326 has another aperture for a fastener (also referred to as the "positioning pin" or the "anti-rotation pin") 336 configured to lock a rotational position of the eccentric bushing in relation to the opening 322 in the housing 302. To accommodate and engage the fastener 336, the housing 302 includes two holes 340, 342, only one of which is used for a given gearbox construction. Each hole 340, 342 can be a threaded blind hole. The threads of the holes 340, 342 can have a thread pitch matching a thread pitch of a threaded portion of the fastener 336. In other constructions, the fastener 336 may engage the holes 340, 342 without being threaded together. In the illustrated construction in which the two orientations of the eccentric bushing 326 are reversed with respect to each other, the two holes 340, 342 for the fastener 336 are diametrically opposed. The two holes 340, 342 are both at or near a plane that contains the input gear axis A1 and the idler gear axis A2 and that bisects the axes A3, A4 of the output gears 112. The hole 340 used for the shorter gear ratio of gearbox 300 is positioned between the axes A1, A2 (and within the span of the distance L). The hole 342 used for the taller gear ratio of gearbox 400 is positioned on a side of the idler gear axis A2 that is opposite that of the input gear axis A1 (and outside the span of the distance L). Although the mount pin 124 is engaged to clamp the bushing 326 against an interior surface of the housing 302, the clamping at the mount pin 124 is not solely relied upon to maintain the rotational orientation setting of the bushing 326. Also, the rotational orientation of the mount pin 124 has no effect on the rotational orientation of the bushing 326, as the mount pin 124 does not have any eccentric portion.

Figures 11, 12:
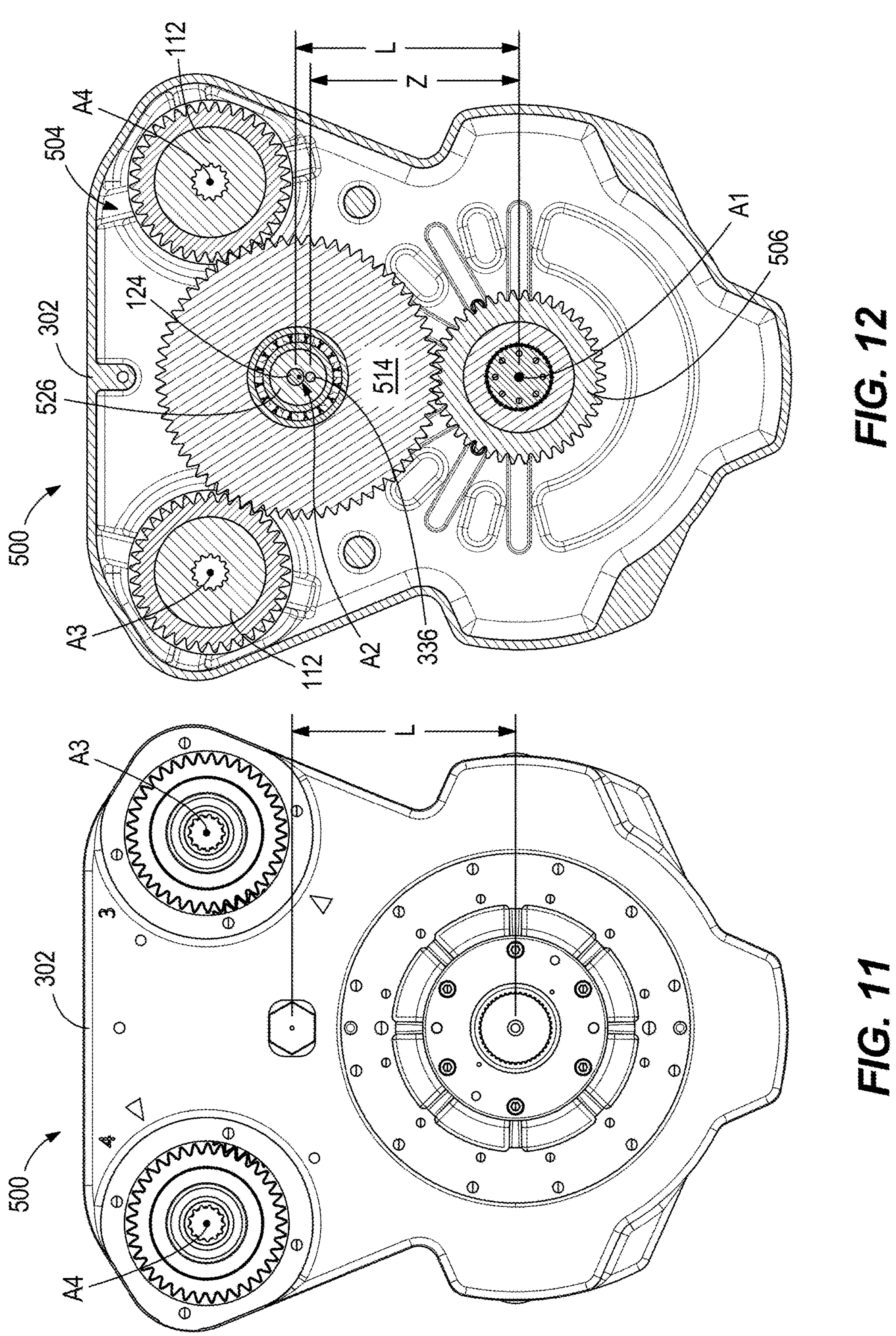
FIG. 11 is a rear view of a gearbox according to yet another embodiment of the present disclosure that uses the same gearbox housing as FIGS. 7-10, and an alternate eccentric bushing, to provide a third offset distance between the input gear axis and the idler gear axis, corresponding to a third gear ratio.
FIG. 12 is a front view of the gearbox of FIG. 11.

FIGS. 11 and 12 illustrate yet another PTO gearbox 500, similar to the gearboxes of the preceding disclosure, but providing yet another different gear ratio (e.g., 1:1.14). In the gearbox 500, the geartrain 504 includes the two output gears 112 along with a unique (different diameter/tooth count) input gear 506 and a unique idler gear 514 as compared to the gearboxes 300, 400. By way of an alternate eccentric bushing 526, the same housing 302 as the gearboxes 300, 400 can again be used for the gearbox 500, this time yielding an offset distance Z between the axes A1, A2. Although the eccentric bushing 526 has a different eccentric offset as measured between the geometric center of the outside cylindrical surface and the hole for the mount pin 124, an offset distance between the holes 550, 552 in the bushing 526 for the mount pin 124 and the fastener 336 is the same as that between holes 350, 352 of the eccentric bushing 326 used in the gearboxes 300, 400. Thus, the fastener 336 is configured to utilize one of the same holes 340, 342 in the housing 302 as are used with the bushing 326. Although only one embodiment using the alternate eccentric bushing 526 is shown (i.e., using the hole 340 for the fastener 336), one of skill in the art will appreciate that another embodiment is provided wherein the eccentric bushing 526 is reversed and the fastener 336 engages the other hole 342. Such an embodiment would utilize unique input and idler gears from the geartrain 504 and provide another different gear ratio.

Figures 13, 14:
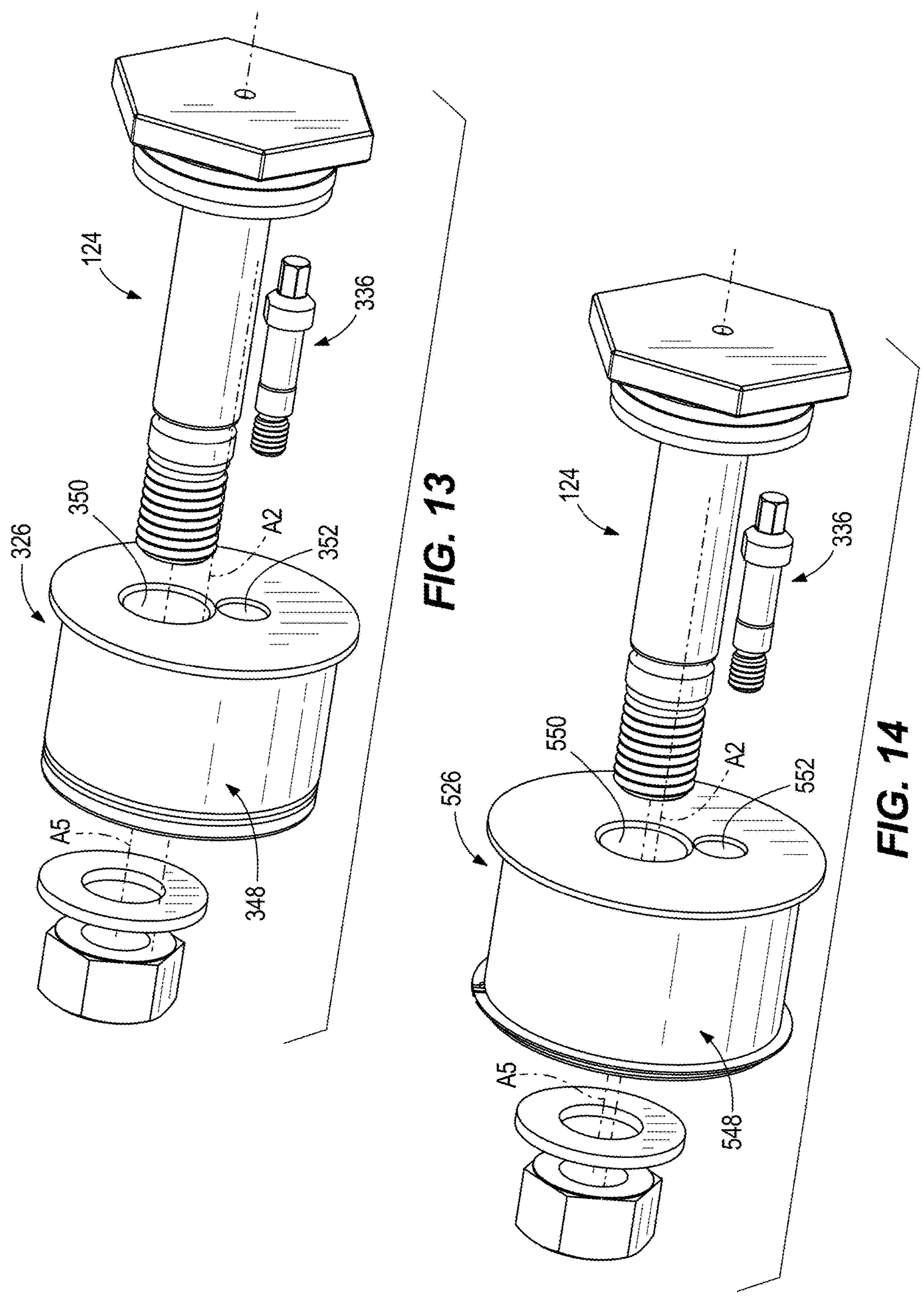
FIG. 13 is an exploded perspective view of the mount hardware, including the eccentric bushing, used in the gearboxes of FIGS. 7-10.
FIG. 14 is an exploded perspective view of the mount hardware, including the eccentric bushing, used in the gearbox of FIGS. 11 and 12.

FIG. 13 illustrates the mount, including the eccentric bushing 326, for the gearboxes 300, 400 of FIGS. 7-10. FIG. 14 illustrates the mount, including the eccentric bushing 526, for the gearbox 500 of FIGS. 11 and 12. As mentioned briefly above, each eccentric bushing 326, 526 includes a cylindrical outer surface 348, 548 for directly or indirectly supporting the idler gear for rotation. This defines the idler gear axis A2. The outer cylindrical surface 348, 548 can be bounded by a flange and/or retaining ring as shown, to retain the bearing in a prescribed axial position. Each eccentric bushing 326, 526 further includes a mounting hole 350, 550 for receiving the mounting pin 124. Each eccentric bushing 326, 526 further includes an additional hole 352, 552 for receiving the fastener 336. In each case, the mounting hole 350, 550 is larger than the additional fastener hole 352, 552 due to the mount pin 124 having a larger diameter than the fastener 336. The holes 350, 352, 550, 552 are all offset from the idler gear axis A2.

In some constructions, a gearbox may be constructed similar to that of FIGS. 7-12, but with only a single output gear 112. For example, if the customer requirement is for a single pump driven by the power take-off. In other constructions, a gearbox may be constructed with more than the two output gears 112 illustrated in FIGS. 7-12. For example, three or four output gears may be provided in the geartrain within the housing, all driven from the input and idler gears. In some cases, one or more of the output gears 112 can be coupled to the housing with a reconfigurable mount like those shown in FIGS. 13 and 14.

Although some aspects have been described in detail with reference to certain preferred embodiments, variations and modifications exist within the scope and spirit of one or more independent aspects as described. Various features and advantages of the invention are set forth in the following claims.

What is claimed is:

1. A gearbox comprising:

a housing defining an interior cavity, the housing including a first hole and a second hole, wherein the first and second holes are blind holes only open to an interior surface of the housing;

an input shaft rotatably supported by the housing; and a geartrain situated in the interior cavity, the geartrain including an input gear fixed for rotation with the input shaft relative to the housing about an input axis, an idler gear configured for rotation about an idler gear axis from the input gear and supported by the housing through a reconfigurable mount, and a pair of output gears configured for rotation from the idler gear and supported by the housing;

wherein the reconfigurable mount includes a mount pin extending along a mount axis through the idler gear and an opening in the housing, an eccentric bushing positioned around the mount pin and centrally within the idler gear, wherein the eccentric bushing is rotatable relative to the mount pin about the mount axis to alter an offset between the input axis and the idler gear axis, wherein the mount pin is configured to clamp the eccentric bushing to the interior surface of the housing along the mount axis, and a fastener configured to lock a rotational position of the eccentric bushing in relation to the opening in the housing regardless of whether the eccentric bushing is clamped to the housing by the mount pin, wherein the fastener is engageable in the first hole of the housing to accommodate a first gear ratio between the input gear and the pair of output gears, and the fastener is engageable in the second hole of the housing to accommodate a second gear ratio between the input gear and the pair of output gears, wherein each of the first and second holes extends parallel to the mount axis, and wherein the fastener and the first and second holes are inaccessible when the eccentric bushing is clamped to the housing by the mount pin.

2. The gearbox of claim 1, wherein the input axis is defined at a fixed location on the housing, and the pair of output gears are supported for rotation by the housing about respective fixed axes.

3. The gearbox of claim 1, wherein the first hole and the second hole for the fastener are diametrically opposed about the opening in the housing.

4. The gearbox of claim 1, further comprising a rolling element bearing configured to provide rolling support of the idler gear on an outside of the eccentric bushing.

5. The gearbox of claim 1, wherein the first hole and the second hole are threaded blind holes having a thread pitch matching a thread pitch of the fastener.

6. The gearbox of claim 1, wherein the housing includes a first pump pad configured to mount a first pump and a second pump pad configured to mount a second pump, wherein the first and second pump pads are aligned with the pair of output gears, respectively.

7. The gearbox of claim 1, wherein the first gear ratio is 1:1 and the second gear ratio is 1:1.27.

8. The gearbox of claim 1, further comprising an alternate eccentric bushing configured to replace the eccentric bushing in the opening of the housing and further alter the offset between the input axis and the idler gear axis to accommodate a third gear ratio of 1:1.14 between the input gear and the pair of output gears.

9. A gearbox comprising:

an input shaft configured to provide engine power into the gearbox, the input shaft supporting an input gear thereon;

a housing supporting the input shaft, the input shaft and the input gear being rotatable about a first axis that is fixed relative to the gearbox, wherein the housing includes a first hole and a second hole, wherein the first and second holes are blind holes only open to an interior surface of the housing; and a second gear supported by the housing and rotatable relative to the housing about a second axis, wherein the second gear is supported by the housing through a reconfigurable mount including a mount pin extending along a mount axis through the second gear and an opening in the housing, a bushing positioned around the mount pin and centrally within the second gear, wherein the bushing has a mounting hole for the mount pin that is eccentric with an outer cylindrical surface of the bushing such that the bushing is rotatable relative to the mount pin about the mount axis to alter an offset between the first axis and the second axis, wherein the mount pin is configured to clamp the bushing to the interior surface of the housing along the mount axis, and a fastener configured to lock a rotational position of the bushing in relation to the opening in the housing regardless of whether the bushing is clamped to the housing by the mount pin, wherein the fastener is engageable in the first hole of the housing to accommodate a first offset distance between the first axis and the second axis, and the fastener is engageable in the second hole of the housing to accommodate a second offset distance between the first axis and the second axis, wherein each of the first and second holes extends parallel to the mount axis, and wherein the fastener and the first and second holes are inaccessible when the bushing is clamped to the housing by the mount pin.

10. The gearbox of claim 9, wherein the first hole and the second hole for the fastener are diametrically opposed about the opening in the housing.

11. The gearbox of claim 9, further comprising a rolling element bearing configured to provide rolling support of the second gear on the outer cylindrical surface of the bushing.

12. The gearbox of claim 9, wherein the first hole and the second hole are threaded blind holes having a thread pitch matching a thread pitch of the fastener.

13. The gearbox of claim 9, further comprising at least one output gear driven by the second gear, and wherein the housing includes, for each of the at least one output gear, a corresponding pump pad configured to mount a pump, wherein the pump pad is aligned with the at least one output gear.

14. The gearbox of claim 13, wherein the first offset distance between the first axis and the second axis corresponds to a first gear ratio between the first gear and the at least one output gear, and the second offset distance between the first axis and the second axis corresponds to a second gear ratio between the first gear and the at least one output gear.

15. The gearbox of claim 14, further comprising an alternate bushing configured to replace the eccentric bushing in the opening of the housing and further alter the offset between the first axis and the second axis to accommodate a third gear ratio between the first gear and the at least one output gear.

16. A method of assembling a gearbox, comprising:

providing a housing accommodating an input gear, an idler gear driven from the input gear, and at least one output gear driven from the idler gear, the housing having a first opening defining a first axis about which the input gear is rotatable and a second opening defining a second axis;

mounting the idler gear on a mount pin with a bushing therebetween, the bushing having an outer cylindrical surface and a mounting aperture through which the mount pin is received along the second axis, wherein the mounting aperture in the bushing is eccentric with the outer cylindrical surface;

setting a selected rotational orientation of the bushing with respect to the housing, the selected rotational orientation being based on a gear ratio between the input gear and the at least one output gear, wherein the selected rotational orientation places an off-center hole of the bushing in alignment with a selected one of two separate alignment holes provided as blind holes in an interior surface of the housing;

locking the selected rotational orientation of the bushing by inserting a fastener parallel to the second axis through the off-center hole of the bushing into engagement with the selected one of the two separate alignment holes; and after setting and locking the selected rotational orientation of the bushing, clamping the bushing to the housing along the second axis by extending the mount pin through the second opening, wherein clamping the bushing to the housing blocks access to the fastener.

17. The method of claim 16, wherein the fastener is threaded into engagement with the selected one of the two separate alignment holes in the housing.

* * * * *